H. N. BRAWNER, Jr.
METHOD OR PROCESS OF HOMOGENIZING CREAM.
APPLICATION FILED AUG. 28, 1912.
1,112,594.
Patented Oct. 6, 1914.
2 SHEETS—SHEET 2.
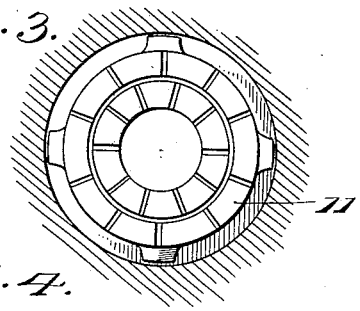
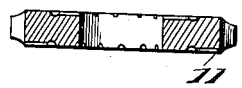
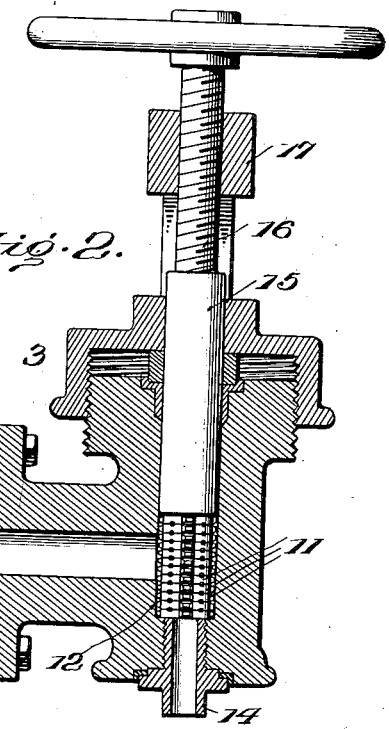
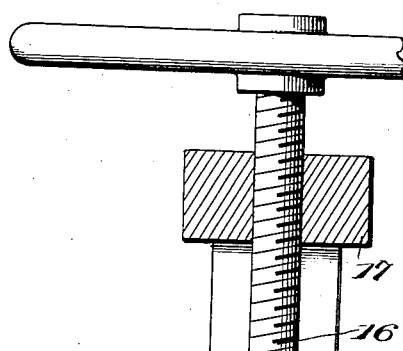
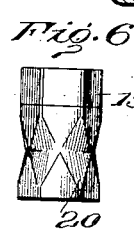
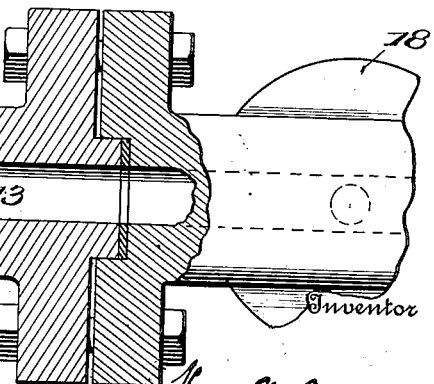

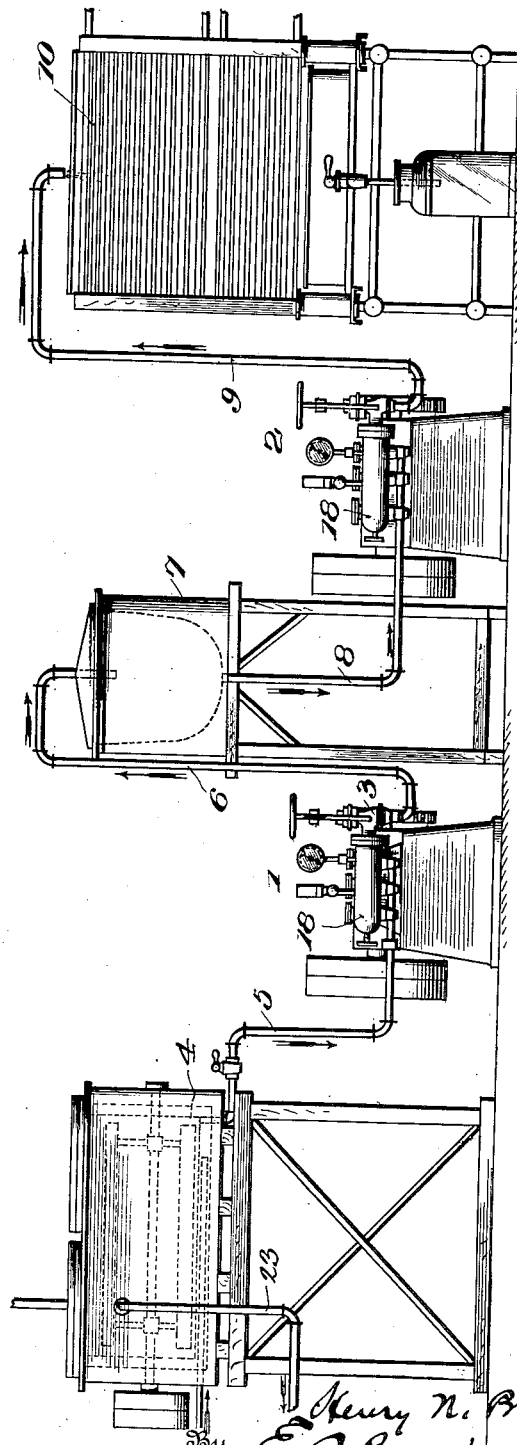

UNITED STATES PATENT OFFICE.

HENRY N. BRAWNER, JR., OF WASHINGTON, DISTRICT OF COLUMBIA.

METHOD OR PROCESS OF HOMOGENIZING CREAM.

1,112,594.     Specification of Letters Patent.     Patented Oct. 6, 1914.

Application filed August 28, 1912. Serial No. 717,497.

*To all whom it may concern:*

Be it known that I, HENRY N. BRAWNER, Jr., a citizen of the United States, residing at Washington, in the District of Columbia, have invented certain new and useful Improvements in Methods or Processes of Homogenizing Cream, of which the following is a specification.

My invention relates to an improvement in a method or process of homogenizing cream.

The object is to break up the fat globules and emulsify all of the constituents of the cream under treatment into a smooth, thick homogenized product.

With this object in view, my invention consists in the double homogenizing of cream, that is to say, the repeated homogenizing treatment of the cream.

In the accompanying drawings:—Figure 1 is a diagrammatic view of homogenizing apparatus wherein the cream to be homogenized is passed successively through two homogenizing machines so that it is readily subjected to the homogenizing action; Fig. 2 is a vertical sectional view through a homogenizing device; Fig. 3 is a detail view of one of the disks forming part of the homogenizing device; Fig. 4 is a sectional view through said disks; Fig. 5 is a vertical sectional view of another form of homogenizing device; and Fig. 6 is a view in elevation of two hollow blocks in lieu of the disks used in the apparatus set forth in Fig. 2.

The numerals 1 and 2 represent two homogenizing machines, each of which has a homogenizing head 3 through which the homogenizing is effected.

The numeral 4 indicates a tank from which a pipe 5 leads to homogenizer 1, and a pipe 6 leading from this homogenizer discharges into an elevated tank 7, whence it descends through a pipe 8 into the homogenizer 2, and from this it is conducted through a pipe 9 to the upper end of a cooler 10, whence the product is removed in cans or other receptacles for distribution.

Before delivering the cream to the homogenizing device, or apparatus, the cream is heated by any suitable means, and as shown in Fig. 1, the cream is heated by a heating medium passing through a pipe 23, which heating medium is introduced into a jacket of the tank in water to raise the temperature of the cream to the desired point before it enters the first homogenizing apparatus.

While I have shown two homogenizers in my diagrammatic view for repeating the process of homogenization, it is perfectly obvious that the same thing might be accomplished by running the cream a second time or repeatedly through the same homogenizer.

I have illustrated two forms of mechanism in which I have carried out my improved process successfully, namely that shown in Fig. 2, in which a plurality of radially-grooved rings or disks 11, 11, are superimposed in the bore 12 of the homogenizer opposite the inlet 13, where they are held under pressure between a lower bushing 14 screwed into the lower end of the homogenizer and a plunger or space-block 15 inserted above the disks through which the required pressure is applied by means of a screw 16 turning in the nut 17. The cream is forced under pressure by a pump 18 through inlet 13, thence between the radially-grooved rings or disks, and finally out through bushing 14.

With the foregoing mechanism I have practised my process in a single machine by simply passing the cream through the second time, and obviously the same thing might be accomplished by providing two machines in series as illustrated in Fig. 1 of my drawings and passing it through one homogenizer, and then through the other, and as many more for that matter as the exigency might require.

In Fig. 5 I have shown a form of apparatus in which the double homogenizing process has been carried out most successfully by passing it once through the homogenizer between double surfaces. This is done by providing either one or two hollow plugs 19 and 20 in lieu of the disks, and providing them with plane surfaces which come in contact with each other, and with the bushing at the bottom and the space-block at the top. The lower plug is provided with an annular well 21 at each end, and the upper plug with an annular well 22 at the top. The cream on being forced between the two plugs and between the space-block or plunger and upper plug is forced between the two separated annular smooth surfaces on either side of the intermediate well, thus subjecting it to a double homogenizing or two homogenizing actions or processes in a single passage through the machine. In this way, no fat globule can escape being broken up, and the whole product is uniformly emulsified in a single passage through the machine.

It is perfectly obvious that other forms of apparatus might be adopted in carrying out my improved process; I have merely illustrated two forms which by actual demonstration I have proved to be successful.

Having fully described my invention, what I claim as new and desire to secure by Letters Patent, is:—

1. The improvement in the art of homogenizing cream which consists in subjecting the cream to repeated homogenizing action to avoid the occurrence of curd in the final homogenized product.

2. The hereindescribed process which consists in subjecting cream to a homogenizing action, and then subjecting the cream homogenized in the first action to a second homogenizing action to break up the curd formed during the first homogenizing action.

3. The hereindescribed process which consists in heating cream to a suitable temperature, subjecting the heated cream to a homogenizing action, repeating such homogenizing action upon the cream, and then cooling the cream.

In testimony whereof I affix my signature, in the presence of two witnesses.

HENRY N. BRAWNER, JR.

Witnesses:
WATTS T. ESTABROOK,
R. C. BRADDOCK.